W. Ap WILLIAMS.
Metallic Pump-Valve.

No. 209,740. Patented Nov. 5, 1878.

Witnesses
Villette Anderson.
F. J. Masi.

Inventor
William Ap Williams
by E. W. Anderson
Attorney.

UNITED STATES PATENT OFFICE.

WILLIAM AP WILLIAMS, OF CAMBRIA, WISCONSIN.

IMPROVEMENT IN METALLIC PUMP-VALVES.

Specification forming part of Letters Patent No. 209,740, dated November 5, 1878; application filed September 14, 1878.

*To all whom it may concern:*

Be it known that I, WILLIAM AP WILLIAMS, of Cambria, in the county of Columbia and State of Wisconsin, have invented a new and valuable Improvement in Metallic Pump-Valves; and I do hereby declare that the following is a full, clear, and exact description of the construction and operation of the same, reference being had to the annexed drawings, making a part of this specification, and to the letters of reference marked thereon.

Figure 1:
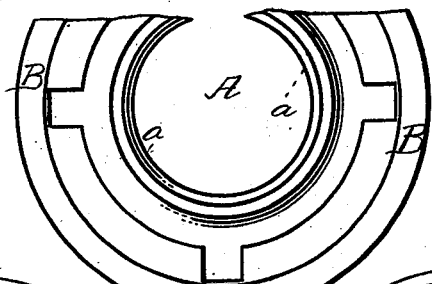
Figure 2:
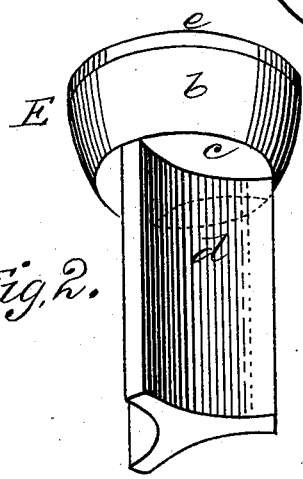
Figure 3:
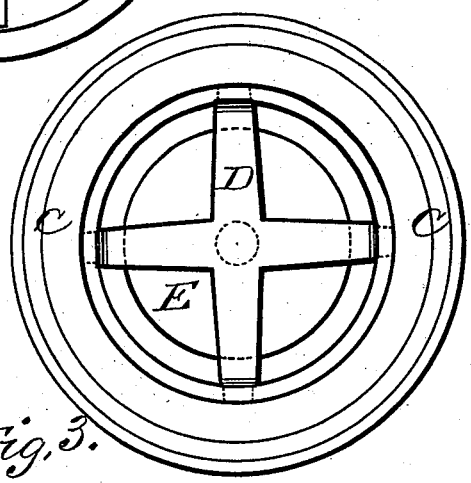
Figure 4:
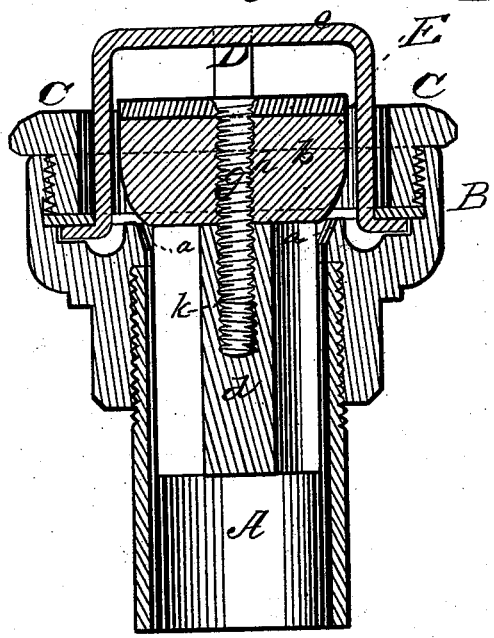

Figure 1 of the drawings is a top view of the pipe, showing the valve-seat and valve-case. Fig. 2 is a perspective view of the valve-block. Fig. 3 is a top view of the complete valve, and Fig. 4 is a longitudinal central section of the same.

This invention has relation to metallic pump-valves; and it consists in the construction and novel arrangement of a rubber valve-block of somewhat hemispherical form, resting on a concave marginal valve-seat, and provided on its upper surface with a metallic weight-plate and below with a ribbed metallic guide, connected to said weight-plate by a screw rod or stem passing through the center of the rubber block, the latter fitting down into the concave valve-seat, as hereinafter shown and described.

In the accompanying drawings, the letter A designates a pipe, at the head of which the valve is located. B is the valve-casing, having the screw-cap C and the guard or check D.

The valve-seat $a$ is made deeply beveled or concave, so that sand will not remain upon its surface, but will fall back in the pipe, and in this way sand-clogging will be avoided.

The valve E consists of a rubber block, $b$, of somewhat hemispherical curvature on its sides, the bottom being usually flattened, as indicated at $c$, to receive the upper end of the triangular or ribbed guide or stem $d$.

The widest portion of the rubber block is its upper part, and it gradually curves toward the bottom to fit neatly the valve-seat $a$. The top of the rubber valve is flat, and resting upon it is the metallic weight-plate $e$, which is provided with a screw rod or stem, $g$, designed to pass through a central hole, $h$, in the rubber valve, and enter a threaded aperture in its under stem $d$, as indicated at $k$.

The stem $d$ fits neatly in the pipe below the valve-seat and keeps the valve upright and true on said seat. The valve-stem is made solid and weighty, and aids the weight-plate on the top of the valve-block in keeping the same to its work. These valves are designed to serve an efficient purpose in deep wells, where sand is a formidable obstruction.

I am aware that a valve constructed of two metallic pieces with a flat disk of leather or rubber between them, connected together by a bolt, is not new. I am also aware that such a valve having a flanged guide extending into a tube having a valve-seat is not new. Hence I make no claim to such devices.

Having described this invention, what I claim, and desire to secure by Letters Patent, is—

The combination, with the inwardly-beveled valve-seat $a$, of the valve E, having the hemispherical rubber block $b$, the top weight-plate $e$ resting thereon, and the ribbed or triangular under stem $d$, connected to said weight-plate by a screw rod or stem passing through a central hole in said rubber block $b$, the latter fitting down into the concave valve-seat, substantially as specified.

In testimony that I claim the above I have hereunto subscribed my name in the presence of two witnesses.

WILLIAM AP WILLIAMS.

Witnesses:
EDWARD L. WILLIAMS,
E. O. JONES.